US009443014B2

(12) United States Patent
Shieh et al.

(10) Patent No.: US 9,443,014 B2
(45) Date of Patent: Sep. 13, 2016

(54) CUSTOM WEB PAGE THEMES

(75) Inventors: Jesse Shieh, Alpharetta, GA (US); Yu Liang, Beijing (CN)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 14/007,607

(22) PCT Filed: Mar. 30, 2011

(86) PCT No.: PCT/CN2011/072290
§ 371 (c)(1),
(2), (4) Date: Sep. 25, 2013

(87) PCT Pub. No.: WO2012/129786
PCT Pub. Date: Oct. 4, 2012

(65) Prior Publication Data
US 2014/0019441 A1 Jan. 16, 2014

(51) Int. Cl.
*G06F 17/30* (2006.01)
*G06Q 30/02* (2012.01)

(52) U.S. Cl.
CPC ..... *G06F 17/30864* (2013.01); *G06F 17/3087* (2013.01); *G06F 17/30554* (2013.01); *G06F 17/30867* (2013.01); *G06Q 30/02* (2013.01)

(58) Field of Classification Search
CPC .................. G06F 17/30864; G06F 17/30867; G06F 17/3087; G06F 17/30905
USPC ......................................................... 707/728
See application file for complete search history.

(56) References Cited

U.S. PATENT DOCUMENTS

| 2005/0216434 | A1 | 9/2005 | Haveliwala et al. |
| 2009/0077056 | A1 | 3/2009 | Ravikumar et al. |
| 2010/0082661 | A1* | 4/2010 | Beaudreau ........ G06F 17/30867 707/769 |
| 2011/0022465 | A1* | 1/2011 | Malleshaiah .......... G06Q 30/02 705/14.54 |

FOREIGN PATENT DOCUMENTS

| CA | 2681797 | 4/2010 |
| CN | 101609403 | 12/2009 |

OTHER PUBLICATIONS

International Search Report and Written Opinion in International Application No. PCT/CN2011/072290, mailed Jan. 5, 2012, 10 pages.
International Preliminary Report on Patentability in International Application No. PCT/CN2011/072290, issued Oct. 1, 2013, 5 pages.

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer program products, for applying custom web page themes. In one aspect, a method includes receiving a request for search results, where the request includes a search query submitted in an input field by a user; obtaining a search results page in response to the search query; identifying one or more features of the search query; selecting a first visual theme from among a plurality of visual themes, where each visual theme has respective trigger data, based on the one or more features of the search query matching the trigger data of the first visual theme, the first visual theme having theme data, the theme data specifying visual features; and applying the visual features to the search results page for display in a user interface.

10 Claims, 4 Drawing Sheets

CUSTOM WEB PAGE THEMES

CROSS-REFERENCE TO RELATED APPLICATION

This application is a National Stage Application under 35 U.S.C. §371 and claims the benefit of International Application No. PCT/CN2011/072290, filed on Mar. 30, 2011. The disclosure of the foregoing application is hereby incorporated by reference in its entirety.

BACKGROUND

This specification relates to digital data processing, and in particular, to computer-implemented search services.

Internet search engines provide information about Internet accessible resources (e.g., web pages, images, documents, multimedia content) that are responsive to a user's search query by returning a set of search results in response to the search query. A search result includes, for example, a Uniform Resource Locator (URL) and a snippet of information for resources responsive to a query. The search results can be ranked (e.g., in an order) according to scores assigned to the search results by a scoring function. The search results can be presented in a search results web page. In some situations, advertisements that are responsive to the user's search query can also be presented in the search results web page.

SUMMARY

In general, one aspect of the subject matter described in this specification can be embodied in methods that include the actions of receiving a request for search results, where the request includes a search query submitted in an input field by a user; obtaining a search results page in response to the search query; identifying one or more features of the search query; selecting a first visual theme from among a plurality of visual themes, where each visual theme has respective trigger data, based on the one or more features of the search query matching the trigger data of the first visual theme, the first visual theme having theme data, the theme data specifying visual features; and applying the visual features to the search results page for display in a user interface. Other embodiments of this aspect include corresponding systems, apparatus, and computer program products.

These and other embodiments can optionally include one or more of the following features. The one or more features of the search query include at least one of: a term in the search query, a natural language of the search query, a time at which the search query was submitted, or a location from which the search query was submitted. The one or more features of the search query include a location from which the search query was submitted, and the location is a geographical location.

The method further includes receiving an affiliate preference that specifies a particular visual theme for an affiliate of a search engine; where the input field is on a web page of the affiliate, where the request for search results is received by the search engine and further includes an affiliate identifier, and where selecting a first visual theme includes identifying a visual theme that has trigger data matching the affiliate identifier. The search results page includes an advertisement, and selecting a first visual theme comprises identifying a particular visual theme that has trigger data matching the advertisement. The search results page includes an advertisement, and the method further includes modifying the advertisement in accordance with the first visual theme.

Particular embodiments of the subject matter described in this specification can be implemented to realize one or more of the following advantages. Automatically applying custom web page themes reduces how much user interaction is required to set a theme for a web page or website, e.g., a personalized web page or web portal. In addition, applying a custom web page theme to a search results web page can increase a user's awareness of or focus on concepts or things that are relevant to a period of time or to the context of a search, e.g., ideas, products, or services that are particularly relevant to a submitted query or displayed search results in view of features associated with the submitted query or displayed search results (e.g., language, locale, origin, time).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
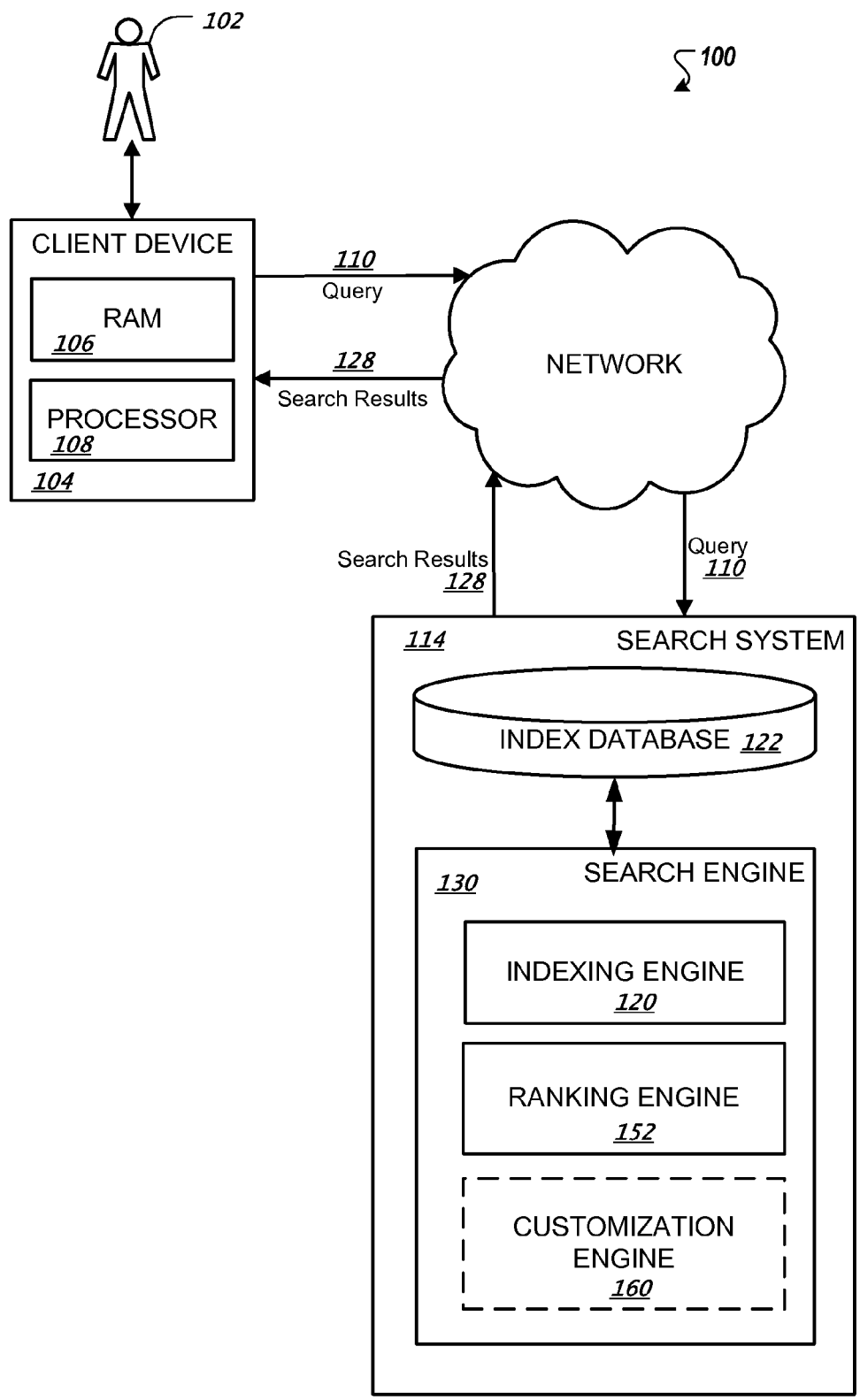
FIG. 1 is a block diagram illustrating an example of a flow of data in some implementations of a system that automatically applies custom web page themes.

FIG. 1 is a block diagram illustrating an example of a flow of data in some implementations of a system 100 that automatically applies custom web page themes. A user 102 interacts with a search system 114 through a client device 104. The search system 114 is an example of an information retrieval system that can be used to generate search results 128 and custom web page themes. The client device 104 can be a computer (e.g., a personal computer, a mobile phone, a smart phone, a tablet computer) coupled to the search system 114 through a wired or wireless local area network (LAN) or wide area network (WAN), e.g., the Internet. In some implementations, the search system 114 and the client device 104 are the same device. For example, a user can install a desktop search application on the client device 104. The client device 104 will generally include a random access memory (RAM) 106 and a processor 108.

A user 102 submits a query 110, e.g., a search query, to a search engine 130 in the search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 for presentation to the user 102 (e.g., as a search results web page to be displayed in a web browser running on the client device 104).

When the query 110 is received by the search engine 130, the search engine 130 identifies documents that match the query 110. The search engine 130 will generally include software that implements an indexing engine 120 that is configured to index documents, e.g., web pages, images, multimedia content, or news articles on the Internet, found in a corpus, e.g., a collection or repository of content, an index database 122 that stores the index information, and a ranking engine 152 (or other software) to rank the documents that match the query 110. The indexing and ranking of the documents can be performed, for example, using conventional techniques. The search engine 130 transmits the search results 128 through the network to the client device 104 for presentation to the user 102.

In some implementations, the search system 114 further includes a customization engine 160 which identifies and selects custom web page themes, e.g., visual themes that are responsive to a request for search results. The search engine 130 provides the custom web page themes to the client device 104 along with the search results 128.

Figure 2:
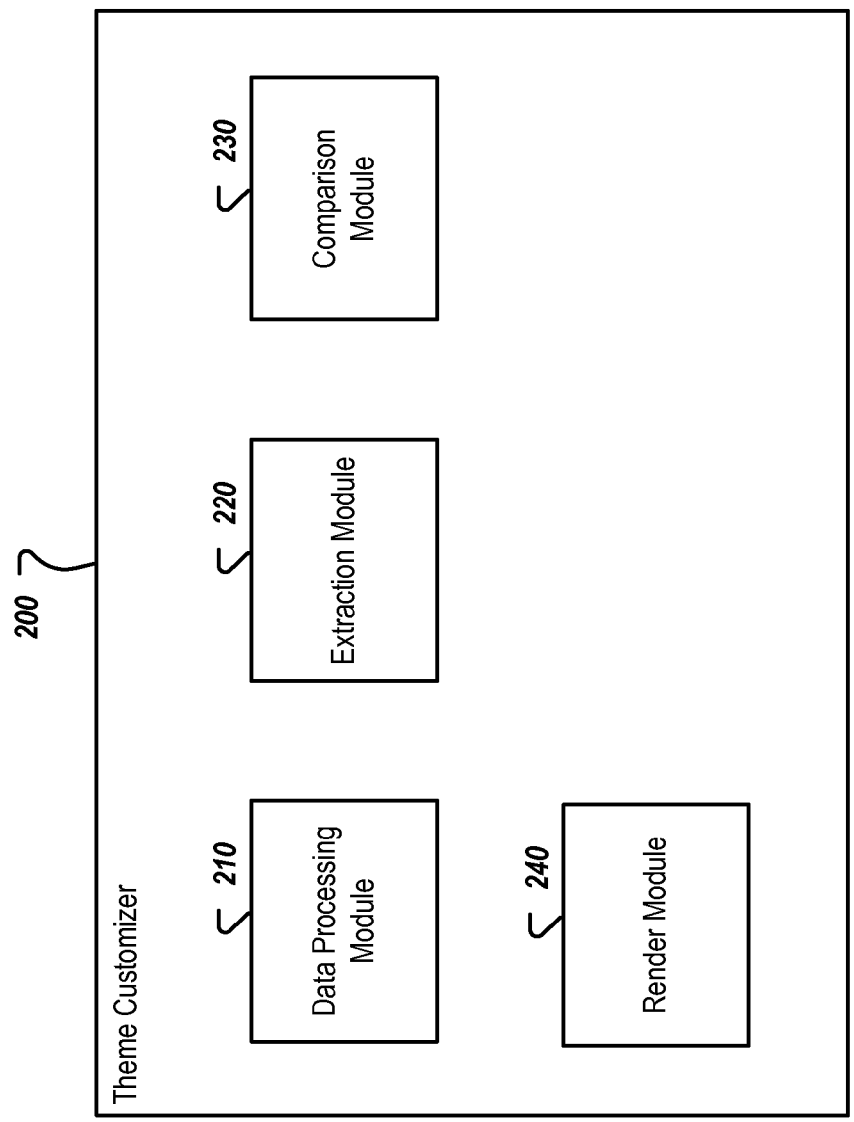
FIG. 2 is a block diagram illustrating an example theme customizer.

FIG. 2 is a block diagram illustrating an example theme customizer 200. The theme customizer 200 includes a data processing module 210, an extraction module 220, and a comparison module 230. The functions performed by these components can be combined in or subdivided among components in ways other than those shown in FIG. 2 and can be distributed on two or more computers.

The data processing module 210 receives a request for search results, e.g., a HyperText Transfer Protocol (HTTP) request. The request for search results includes a search query, e.g., textual input entered and submitted in an input field. The input field can be located in a search engine user interface, e.g., a search query input field in a search engine web page. The input field can also be located in other types of user interfaces. As an example, a web page can provide an interface to a search engine by providing an input field that receives input and sends the input to a search engine. As another example, a toolbar, e.g., a desktop toolbar or toolbar in a web browser, can provide an interface to a search engine by providing an input field that receives input and sends the input to a search engine.

The data processing module 210 obtains from the search engine (e.g., search engine 130) search results that are responsive to the search query. The data processing module 210 also obtains theme data. Example formats of the theme data include Extensible Markup Language (XML) and protocol buffers. A protocol buffer is a language and platform neutral, extensible technique for serializing structured data, e.g., by encoding structured data according to Google's data interchange format, Protocol Buffers, as described in further detail in Google Code: Protocol Buffers, available at http://code.google.com/p/protobuf/).

The theme data includes data defining one or more themes, e.g., custom web page themes. In some implementations, a theme includes HyperText Markup Language (HTML) and Cascading Style Sheets (CSS) data that define visual features for rendering a web page. As examples, the size (e.g., height and width), color, placement, and other visual features of graphics, text, and user interface elements can be defined by the HTML or CSS data. Applying the theme to a search results page, e.g., a search results web page, can include modifying the search results page, e.g., the HTML, or providing CSS data to a client device.

Each theme is also associated with trigger data. The trigger data defines situations in which the theme can be selected and applied, e.g., by the theme customizer 200 without user intervention. The theme data and trigger data can be specified by user input, e.g., by an input from a system administrator or an affiliate. A user can provide theme data and trigger data, e.g., in the form of one or more data files or individual items of data (e.g., a single feature or rule), to the data processing submodule 210 to define a theme.

In some implementations, a theme is specified for use with a search query that has particular features. The theme is considered to be responsive to a request for search results, particularly to the search query. Examples of such features include terms in a search query, a natural language of a search query, a time at which a search query was submitted, and a location from which a search query was submitted. The location can be a geographical location (e.g., New York, Australia), or the location can be a network location (e.g., hostnames that correspond to a network address). One or more features can be associated with a theme in a rule for using the theme.

As an example, a theme can be defined by two groups of data, namely theme data and trigger data. The theme data can be defined using one or more features, e.g., top banner image, background color, and font color. The trigger data can be defined by one or more rules for using the theme. Each rule can be defined using one or more features of a search, e.g., search query, hostname, natural language, location, or whether the search is a moderated search.

When a term in a search query matches a search query term associated with a theme, the likelihood that the theme is appropriate for the search request increases. For example, a theme for Chinese New Year can be associated with the term "Chinese New Year" and the term "Lunar New Year". The theme for Chinese New Year is likely to be appropriate for a search request that includes a search query that includes either of those terms. Furthermore, a natural language of a search query can also provide an indication as to whether the theme is appropriate. Returning to the example, if the search query is in Chinese, the likelihood that the Chinese New Year theme is appropriate may change, e.g., increase.

In addition, a time at which the search query was submitted can also serve as an indicator that a particular theme is appropriate. Search queries submitted in late January or in February may be more likely to be related to Chinese New Year because Chinese New Year typically occurs in late January or in February. The location from which the search query was submitted may also be a factor. In the example, search queries submitted in China or through a Chinese domain, e.g., the .cn domain, may be more likely to be related to Chinese New Year than search queries submitted through other domains. Furthermore, if the search is specified as being a moderated search, a particular theme indicating that the search is a moderated search (e.g., a search that is "safe" from potentially offensive content) is appropriate.

Conventional pattern matching techniques can be used to compare features of a search query to the rule for a theme. The data processing module 210 sends the request for search results to the extraction module 220. The extraction module 220 identifies or extracts one or more features from the request for search results, particularly from the search query. The extraction module 220 sends the request for search results and the extracted features to the comparison module 230. The comparison module 230 compares the extracted features to the trigger data for each theme and determines whether the extracted features match the trigger data beyond a threshold value, e.g., share at least a specified number of features or a specified percentage of the features in common.

As an example, a particular theme can be identified as being responsive to the request for search results if a single feature matches, e.g., when a search query matches a search query term associated with a theme, when a location from which a search query was submitted matches a location associated with the theme, or when a search is specified as being a moderated search. As another example, a particular theme can be identified as being responsive to the request for search results if two features match, e.g., when a search query matches a search query term associated with a theme and a location from which a search query was submitted matches a location associated with the theme.

Themes that match the extracted features of the request for search results beyond the threshold value are identified as being responsive to the request for search results. The theme that is the closest match can be combined with the search results for display in a user interface, e.g., applied to a search results page. Generally, themes are applied user-independently, e.g., the application of a theme is not based on preferences of a user submitting the search query. In some implementations, the user is able to opt-out or otherwise indicate that themes should not be applied to search results returned responsive to search queries submitted by the user.

The search results page can include one or more advertisements. The advertisements can be displayed in the search results page using conventional techniques. As an example, the search results page can include an inline frame (e.g., an iframe) element or JavaScript that is used to embed an advertisement.

In some implementations, in a similar manner as described above, the extraction module 220 extracts features from the advertisements and the comparison module 230 compares the features to identify a theme to apply to the advertisement.

Applying the theme to the advertisement can include modifying visual features of the advertisement. The theme data can define visual features used in modifying the advertisement. As examples, the size (e.g., height and width), color, placement, and other visual features of graphics and text in the advertisement can be modified, e.g., before the advertisement is embedded in the search results page.

In some implementations, a particular theme is specified for an advertisement in the trigger data, e.g., in a rule. In these and other implementations, the trigger data can include identifiers of advertisements that are specified by users, e.g., advertisers, and that indicate which themes should be applied to search result pages that will display particular advertisements.

In some implementations where the search query is submitted in an input field on a web page of an affiliate of a search engine, the request for search results includes an identifier of the affiliate. An affiliate is an entity, e.g., a person or business, associated with the web page. In typical situations, the affiliate is the owner of the web page or the web page includes content that is related to the affiliate. In these and other implementations, the trigger data can also include affiliate identifiers that are specified by the affiliates, e.g., by an affiliate preference, and that indicate which themes should be applied to search result web pages that are provided in response to requests for search results submitted through their web pages.

The data processing module 210 can send the identifier of the affiliate to the comparison module 230, and the comparison module 230 can compare the identifier to affiliate identifiers associated with each theme to identify an appropriate theme to apply. The themes can be visual themes for products or services of the affiliates that advertise the products or services.

In some implementations, the theme data includes instructions for applying a theme to the web page, e.g., rendering visual features of the theme. A default instruction can be to render the web page in a conventional manner, e.g., render, from top to bottom, the web page with the applied theme. If the theme specifies that an image be applied to the top of the web page, then the image is loaded and rendered at a same time as when the original content at the top of the web page is loaded and rendered. Another example instruction can specify that one or more visual features defined by the theme are applied only after all the original content of the web page is loaded and rendered. As a particular example, the image can be applied to the top of the web page after all the original content of the entire web page is loaded and rendered.

In some implementations, the theme is applied across two or more web pages or websites that are customizable for the user. For example, a service provider may provide multiple services to users, including a web portal, email, and search engine. Each of the web portal, email, and search engine services may have its own web page or website. For a particular user, a theme selected for and applied to one web page of a service, e.g., a search results web page, can be automatically applied to web pages of the other services.

Figure 3:
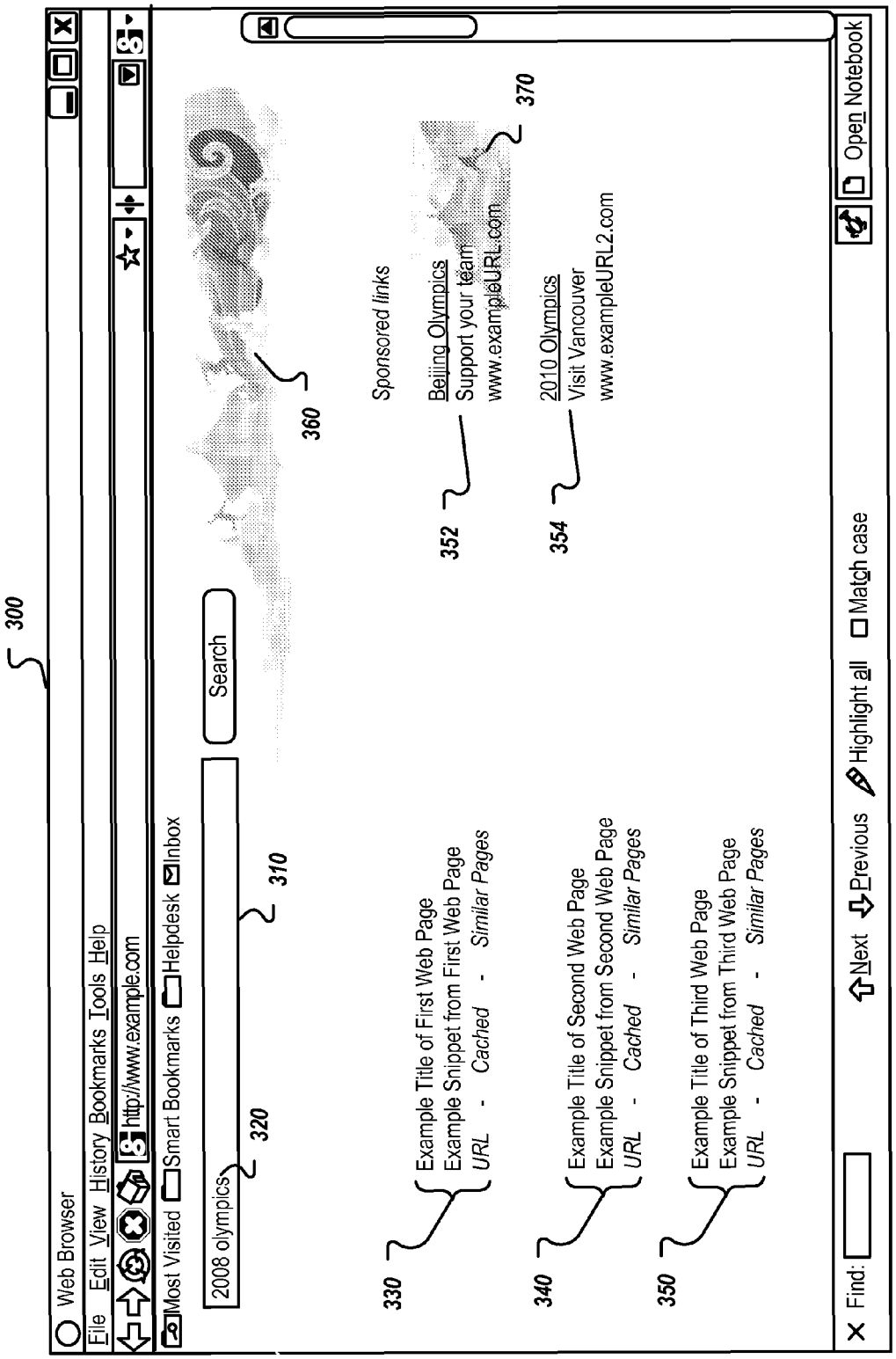
FIG. 3 is a screenshot illustrating an example of a web page presented according to a custom web page theme.

FIG. 3 is a screenshot illustrating an example of a web page presented according to a custom web page theme. The web page includes a search query input field 310. In the search query input field 310 is a search query 320, i.e., the textual input "2008 olympics".

In FIG. 3, the customization engine 160 received a request for search results. The request for search results included the search query 320. The customization engine 160 obtained search results 330, 340, and 350 that are responsive to the request for search results. The customization engine 160 also obtained advertisements 352 and 354 that are responsive to the request for search results.

The customization engine determined a visual theme that is responsive to the request for search results. Among other visual features that can be changed (e.g., the font colors of the text in the advertisements or the search results), applying the visual theme to the web page included rendering image 360 in the background of the web page and rendering image 370 in the background of advertisement 352. Note that the Olympics were held in Beijing, China in 2008. Therefore, a theme related to the Beijing Olympics was selected that included images representative of the Beijing Olympics. Note that an image for the theme was not applied to the advertisement 354 because the advertisement 354 is an advertisement for the 2010 Olympics to be held in Vancouver, and is not particularly related to the Beijing Olympics or its associated theme.

Figure 4:
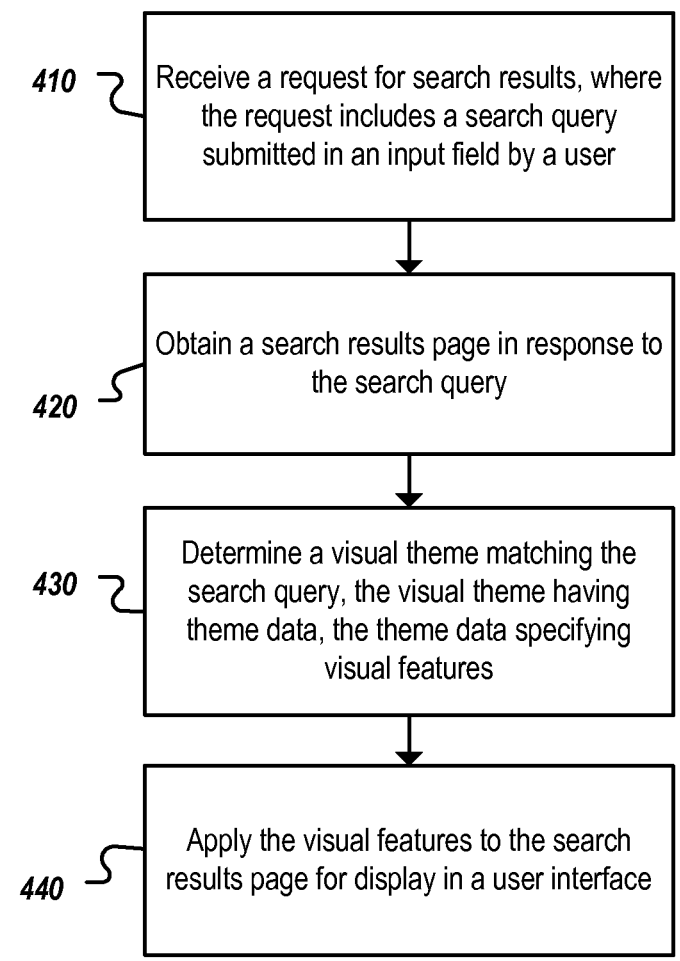
FIG. 4 is a flow chart showing an example process for automatically applying custom web page themes.

FIG. 4 is a flow chart showing an example process 400 for automatically applying custom web page themes. The process 400 includes receiving 410 a request for search results. The request includes a search query submitted in an input field by a user. The process 400 also includes obtaining 420 a search results page in response to the search query. The process 400 also includes determining 430 a visual theme matching the search query. The visual theme has theme data. The theme data specifies visual features. The process 400 also includes applying 440 the visual features to the search results page for display in a user interface.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an affiliate preference that specifies a particular visual theme for an affiliate of a search engine, the affiliate being an entity different from the search engine;
receiving a request for search results by the search engine, where the request includes a search query submitted in an input field by a user, wherein the input field is included in a web page, wherein the web page is provided by the affiliate, wherein the web page includes content of the affiliate, and wherein the request includes an affiliate identifier identifying the affiliate;
obtaining a search results page in response to the search query;
identifying one or more features of the search query;
selecting a first visual theme from among a plurality of visual themes based on the first visual theme having trigger data matching the affiliate identifier, where each visual theme has respective trigger data, based on the one or more features of the search query matching the trigger data of the first visual theme, the first visual theme having theme data, the theme data specifying visual features; and
applying the visual features to the search results page for display in a user interface.

2. The method of claim 1, where the one or more features of the search query include at least one of: a term in the search query, a natural language of the search query, a time at which the search query was submitted, or a location from which the search query was submitted.

3. The method of claim 2, where the one or more features of the search query include a location from which the search query was submitted, and the location is a geographical location.

4. The method of claim 1, where the search results page includes an advertisement, and selecting a first visual theme comprises identifying a particular visual theme that has trigger data matching the advertisement.

5. The method of claim 1, where the search results page includes an advertisement, and the method further includes modifying the advertisement in accordance with the first visual theme.

6. A system comprising:
one or more computers and one or more storage devices storing instructions that when executed by the one or more computers cause the one or more computers to perform operations comprising:
receiving an affiliate preference that specifies a particular visual theme for an affiliate of a search engine, the affiliate being an entity different from the search engine;
receiving a request for search results by the one or more computers, where the request includes a search query submitted in an input field by a user on a user device that is separate from the one or more computers, wherein the input field is included in a web page, wherein the web page is provided by the affiliate, wherein the web page includes content of the affiliate, and wherein the request includes an affiliate identifier identifying the affiliate;
obtaining a search results page in response to the search query;
identifying one or more features of the search query;
selecting a first visual theme from among a plurality of visual themes based on the first visual theme having trigger data matching the affiliate identifier, where each visual theme has respective trigger data, based on the one or more features of the search query matching the trigger data of the first visual theme, the first visual theme having theme data, the theme data specifying visual features; and
applying the visual features to the search results page for display in a user interface.

7. The system of claim 6, where the one or more features of the search query include at least one of: a term in the search query, a natural language of the search query, a time at which the search query was submitted, or a location from which the search query was submitted.

8. The system of claim 7, where the one or more features of the search query include a location from which the search query was submitted, and the location is a geographical location.

9. The system of claim 6, where the search results page includes an advertisement, and selecting a first visual theme comprises identifying a particular visual theme that has trigger data matching the advertisement.

10. The system of claim 6, where the search results page includes an advertisement, and the method further includes modifying the advertisement in accordance with the first visual theme.

* * * * *